United States Patent [19]

Smith

[11] Patent Number: 5,168,495
[45] Date of Patent: Dec. 1, 1992

[54] NESTED FRAME COMMUNICATION PROTOCOL

[75] Inventor: T. Basil Smith, Wilton, Conn.
[73] Assignee: IBM Corporation, Yorktown Heights, N.Y.
[21] Appl. No.: 698,685
[22] Filed: May 10, 1991
[51] Int. Cl.⁵ ............................................. H04J 3/02
[52] U.S. Cl. .............................. 370/85.6; 340/825.51
[58] Field of Search ............... 370/85.6, 85.2, 85.13, 370/85.14; 340/825.5, 825.51

[56] References Cited

U.S. PATENT DOCUMENTS

4,663,748  5/1987  Karbowiak et al. ............ 370/85.12
4,910,732  3/1990  Schwarz ........................... 340/825.5
5,043,981  8/1991  Firoozmand et al. ............ 370/85.1

Primary Examiner—Douglas W. Olms
Assistant Examiner—Min Jung
Attorney, Agent, or Firm—Sterne, Kessler, Goldstein & Fox

[57] ABSTRACT

A nested frame communication protocol for communicating between computers. According to the nested frame communication protocol of the present invention, the computers communicate by transferring frames over communication links. The transmission of low priority frames may be interrupted in order to transmit high priority frames. After the transmission of the high priority frames is complete, the transmission of the low priority frames resumes. Processing states relating to interrupted frame transmissions are saved when the frame transmissions are interrupted. The processing states are restored when the interrupted frame transmissions are resumed.

13 Claims, 7 Drawing Sheets

NESTED FRAME COMMUNICATION PROTOCOL

TECHNICAL FIELD

The present invention relates generally to a communication protocol for communicating between computers, and more particularly to a nested frame communication protocol for communicating between computers.

BACKGROUND ART

Communication protocols are used for communicating between computers. Many conventional communication protocols are frame-oriented in that data is placed into frames.

The frames are transmitted from a source computer to a destination computer. Conventionally, the frames are sequentially transmitted such that, from a particular source computer, the transmission of a first frame may not be interrupted to transmit a second frame. The second frame may only be transmitted once the first frame has been completely transmitted.

In addition to the data, the frames contain control information. The control information is also called overhead.

The communication protocols attempt to achieve two goals. First, the communication protocols attempt to maximize data transfer rates. To do this, the communication protocols must minimize the fraction of communications channel bandwidth which is devoted to protocol overhead. Second, the communication protocols attempt to minimize transmission latency of high priority frames (that is, frames having high transmission priorities). In other words, the communication protocols attempt to minimize the time from when a high priority frame becomes ready for transmission and when the transmission of the high priority frame actually begins.

To maximize data transfer rates, the conventional communication protocols use large frame sizes so that the frames contain much more data than overhead. Thus, the use of large frame sizes minimizes the fraction of the communications bandwidth needed to transfer the overhead.

However, the conventional communication protocols are flawed because the use of large frame sizes results in high transmission latency of the high priority frames. This is true because the transmission of a high priority frame is frequently delayed when it becomes ready for transmission during the transmission of a preceding frame and it must wait for the completion of the transmission of this preceding frame. This delay, or transmission latency, increases as the frame size of the preceding frames increases (since on average the end of any preceding frame will be further away for longer frames).

The transmission latency of a high priority frame can be minimized by using short frames, but this increases overhead, penalizing the efficiency of larger transmissions. Therefore, the conventional communication protocols are flawed because they necessarily require a compromise between transfer efficiency and transmission latency of high priority frames.

Thus, a communication protocol for communicating between computers is required which maximizes data transfer rates and which minimizes transmission latency of high priority frames.

DISCLOSURE OF INVENTION

The present invention is directed to a communication protocol for communicating between computers, and more particularly to a nested frame communication protocol for communicating between computers.

The nested frame communication protocol operates in computers which are interconnected by communication links. The computers have communication interfaces which are connected to the communication links.

According to the nested frame communication protocol of the present invention, the computers communicate by transferring frames over the communication links. The transmission of low priority frames may be interrupted in order to transmit high priority frames. After the transmission of the high priority frames is complete, the transmission of the low priority frames resumes.

Processing states relating to interrupted frame transmissions are saved when the frame transmissions are interrupted. Specifically, registers containing an intermediate cyclic redundancy code, a buffer select code, a frame sequence number, a remaining buffer count, a current frame set byte count, and a buffer data address are saved on a first-in first-out stack.

The processing states relating to the interrupted frame transmissions are restored when the interrupted frame transmissions are resumed. Specifically, the registers containing the intermediate cyclic redundancy code, the buffer select code, the frame sequence number, the remaining buffer count, the current frame set byte count, and the buffer data address are restored from the first-in first-out stack.

Thus, the nested frame communication protocol of the present invention maximizes data transfer rates (because lower priority data frame sizes can be large) and minimizes transmission latency of high priority frames (because higher priority frames may interrupt the transmission of long lower priority frames).

The foregoing and other objects, features and advantages of the invention will be apparent from the following more particular description of (a) preferred embodiment(s) of the invention, as illustrated in the accompanying drawing(s). In the drawings, like reference numbers indicate identical or functionality similar elements.

BRIEF DESCRIPTION OF DRAWINGS

The present invention will be described with reference to the accompanying drawings, wherein.

BEST MODE FOR CARRYING OUT THE INVENTION

Figure 1:
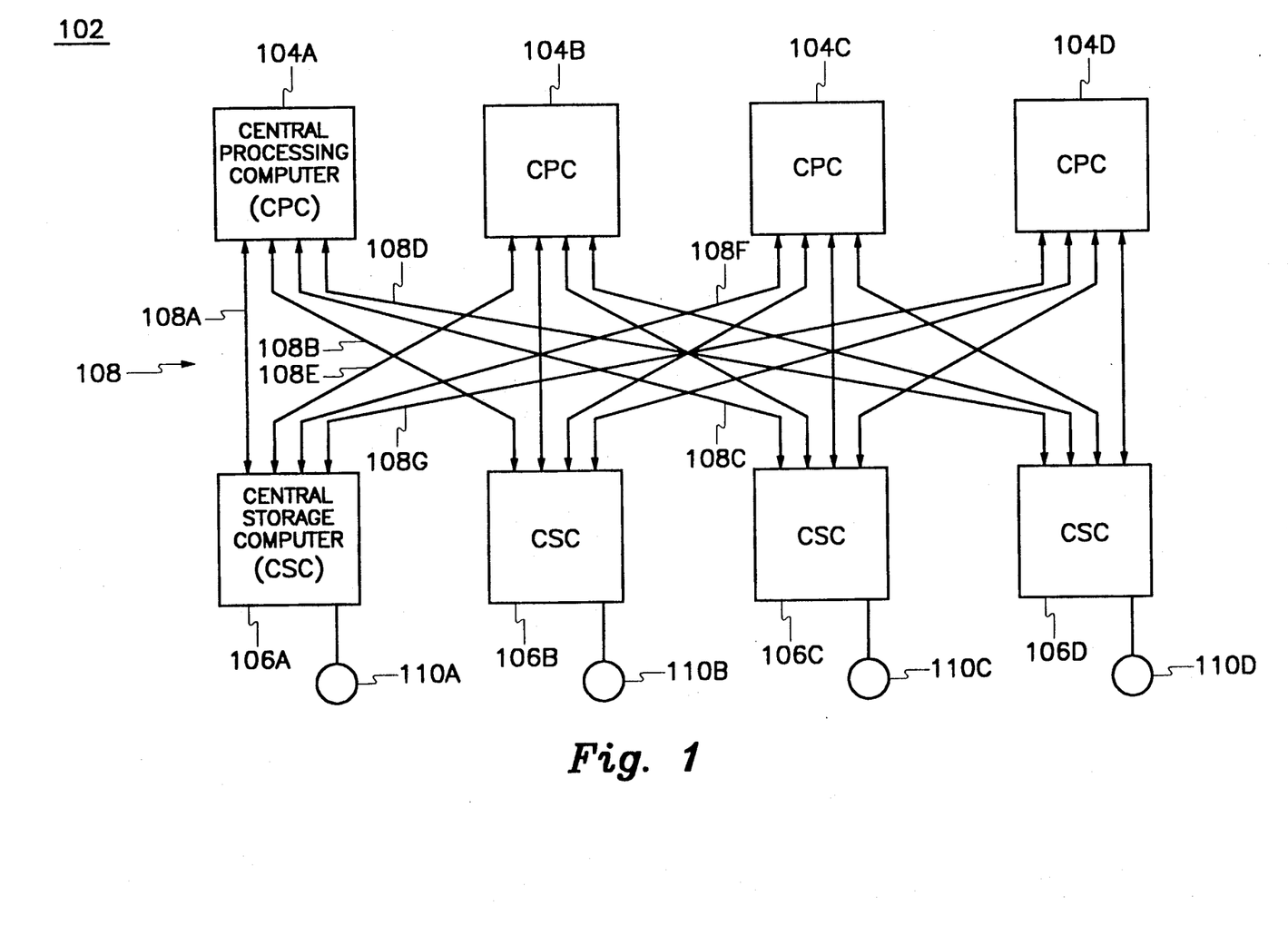
FIG. 1 illustrates a preferred embodiment of the present invention.

FIG. 1 illustrates a preferred embodiment of the present invention. The present invention includes computers 104, 106. The computers 104, 106 are each connected to four communication links 108. The computers 104 communicate with the computers 106 via the communication links 108.

In a preferred embodiment of the present invention, the computers 104 are central processing computers (CPC) 104. Specifically, the computers 104 are International Business Machine (IBM) System 390 computers. The computers 106 are central storage computers (CSC) 106. Specifically, the computers 106 are server computers connected to large capacity secondary storage devices 110.

According to a preferred embodiment of the present invention, three types of CPC/CSC interactions (that is, interactions between the CPCs 104 and the CSCs 106) exist: DX, CX, and SX interactions.

According to the DX (or data exchange) interaction, one of the CPCs 104 sends a READ or WRITE command (which is less than or equal to 256 bytes) to one of the CSCs 106. The WRITE command also includes a data block (which is less than or equal to 32 Kbytes).

For the READ command, the CSC 106 locates and retrieves data from the associated secondary storage device 110, and transmits a data block (which is less than or equal to 32 Kbytes) to the CPC 104. The CSC 106 then sends a reply (which is less than or equal to 256 bytes) to the CPC 104. The reply contains status information regarding the completion of the READ command (for example, a failure code if the READ fails).

For the WRITE command, the CSC 106 saves the data block in the associated secondary storage device 110 and sends a reply to the CPC 104. The reply contains information regarding the status of the WRITE command (for example, whether the WRITE command was successfully performed).

According to the CX (or command exchange) interaction, one of the CPCs 104 sends a command (which is less than 256 bytes) to one of the CSCs 106. For example, the command may represent a data lock request. The CSC 106 processes the command and sends a reply to the CPC 104. The reply contains information regarding the status of the command (for example, whether the lock was granted).

According to the SX (or service exchange) interaction, one of the CSCs 106 sends a command (which is less than 256 bytes) to one of the CPCs 104. For example, the command may represent a data available notification The CPC 104 processes the command and sends a reply to the CSC 106. The reply contains information regarding the status of the command (for example, whether the command was successfully performed).

Figure 2:
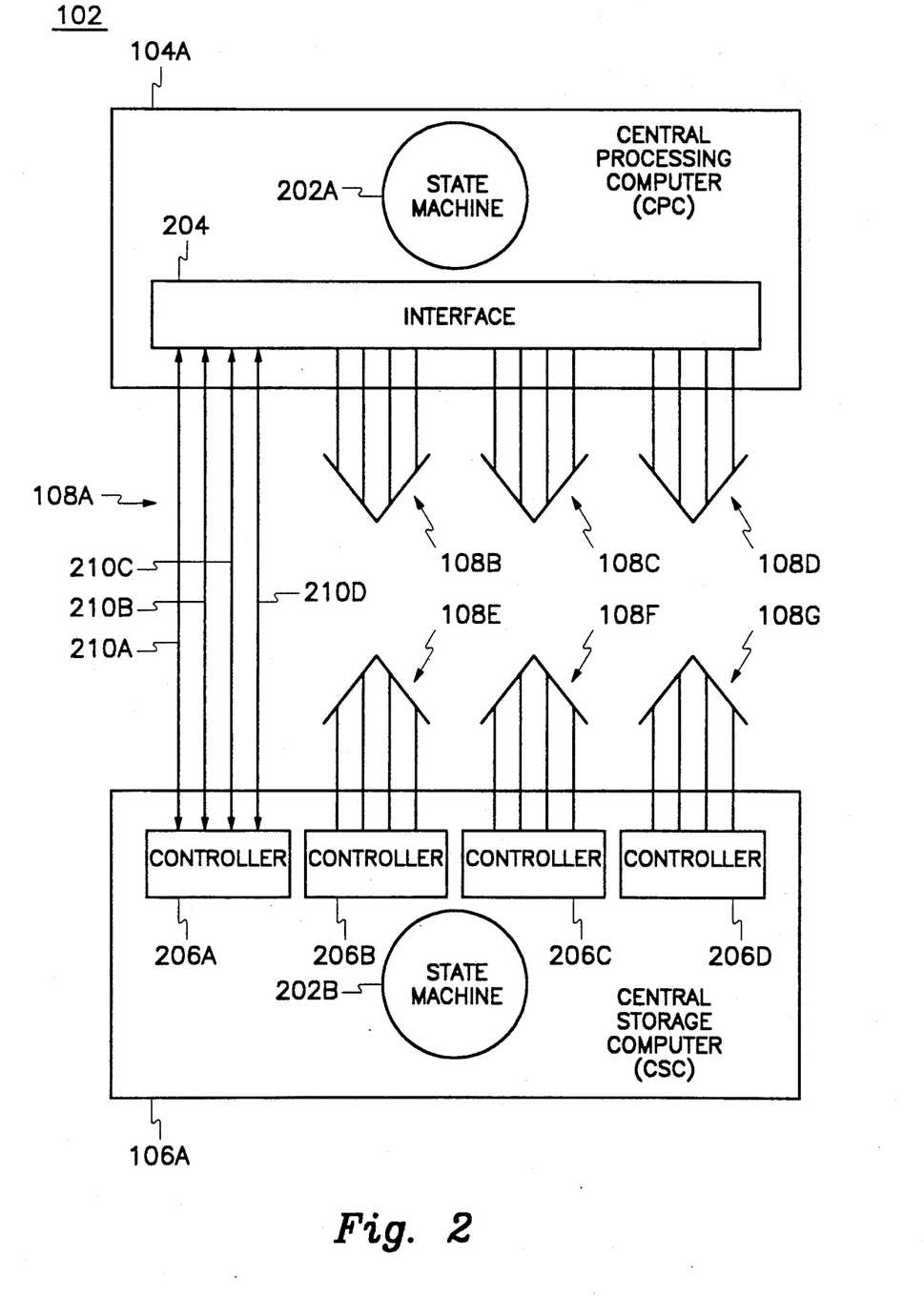
FIG. 2 presents a structural diagram of CPCs 104 and CSCs 106.

FIG. 2 presents a structural diagram of the CPCs 104 and CSCs 106. The structure and operation of the CPCs 104 are the same. The structure and operation of the CSCs 106 are the same. For clarity, only CPC 104A and CSC 106A are shown in FIG. 2.

The CPC 104A contains an interface 204, which is connected to communication links 108A, 108B, 108C, 108D. According to a preferred embodiment of the present invention, each of the communication links 108 includes four fiber optic links operating in parallel. For example, the communication link 108A includes fiber optic links 210A, 210B, 210C, and 210D.

The interface 204 supports multiple, simultaneous, and independent CPC/CSC interactions between the CPC 104A and the CSCs 106 over the communication links 108A, 108B, 108C, 108D. The operation of the interface 204 is controlled by a state machine 202A.

The CSC 106A contains four controllers 206. The controllers 206 are each connected to one of the communication links 108A, 108E, 108F, 108G.

The controllers 206 support multiple, simultaneous, and independent CPC/CSC interactions between the CSC 106A and the CPCs 104 over the communication links 108A, 108E, 108F, 108G. The operation of the controllers 206 is controlled by a state machine 202B.

According to a preferred embodiment of the present invention, the CPC 104A may include one or two interfaces 204. The CSC 106A may include from one to eight controllers 206.

Figure 3:
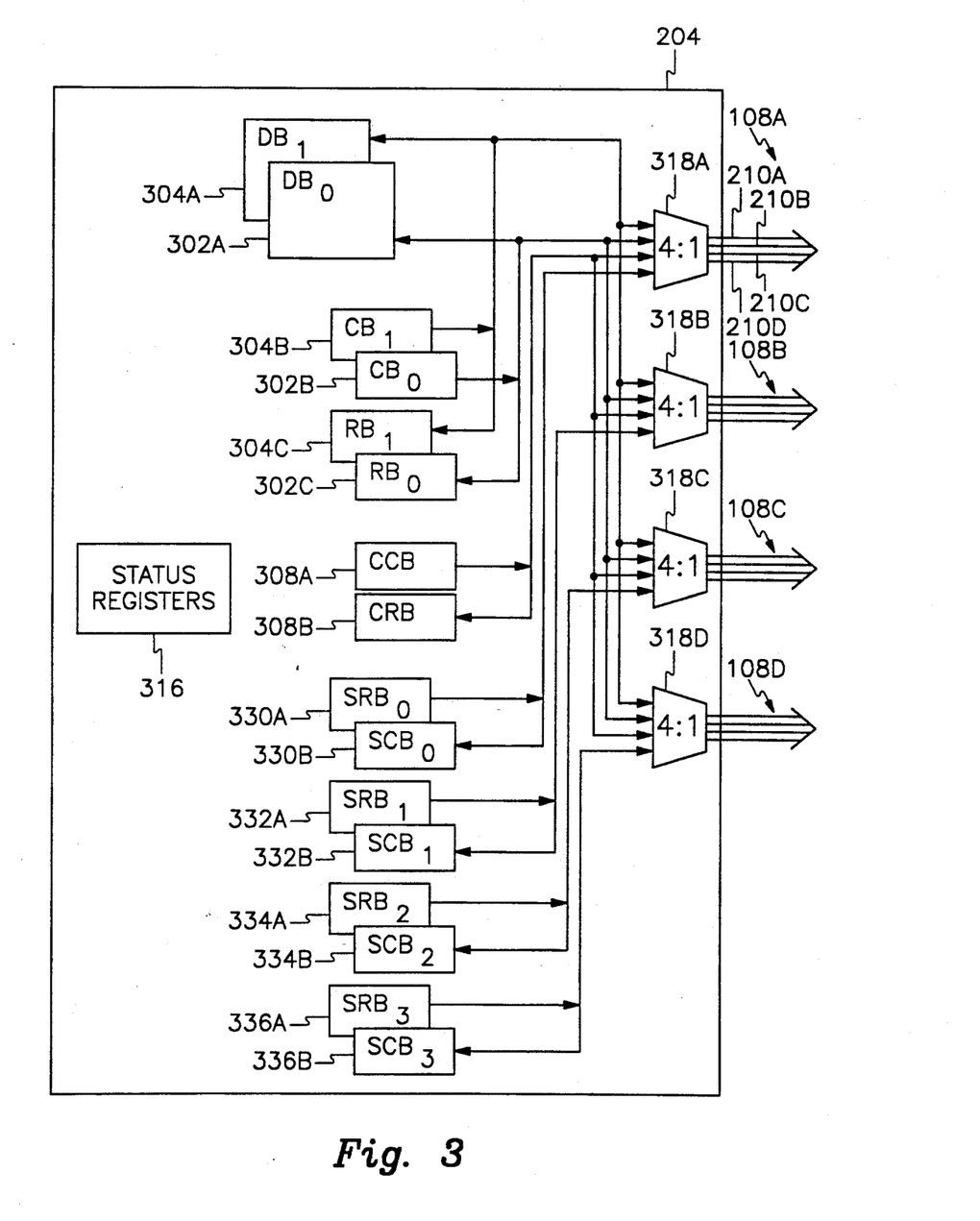
FIG. 3 presents a structural diagram of an interface 204.

FIG. 3 presents a structural diagram of the interface 204. The interface 204 includes DX buffer sets 302, 304, a CX buffer set 308, and four SX buffer sets 330, 332, 334, 336. The DX buffer sets 302, 304 are used during DX interactions. The CX buffer set 308 is used during CX interactions. The SX buffer sets 330, 332, 334, 336 are used during SX interactions.

The DX buffer sets 302, 304 each include a 32 Kbyte data buffer (DB) 302A, 304A, a 256 byte control buffer (CB) 302B, 304B, and a 256 byte return buffer (RB) 302C, 304C.

The CX buffer set 308 includes a 256 byte command buffer (CCB) 308A and a 256 byte response buffer (CRB) 308B.

The SX buffer sets 330, 332, 334, 336 each include a 256 byte response buffer (SRB) 330A, 332A, 334A, 336A and a 256 byte command buffer (SCB) 330B, 332B, 334B, 336B.

The interface 204 also includes frame status registers 316 for each of the communication links 108. Thus, the interface 204 in FIG. 3 includes four sets of frame status registers 316. The interface 204 also includes four 4-to-1 multiplexers.

The interface 204 initiates the DX interactions. A DX buffer set 302, 304 is associated with each DX interaction. The interface 204 may simultaneously process X independent DX interactions, where X equals the number of DX buffer sets 302, 304. For example, since the interface 204 has two DX buffer sets 302, 304, the interface 204 may simultaneously process two independent DX interactions.

Figure 5:
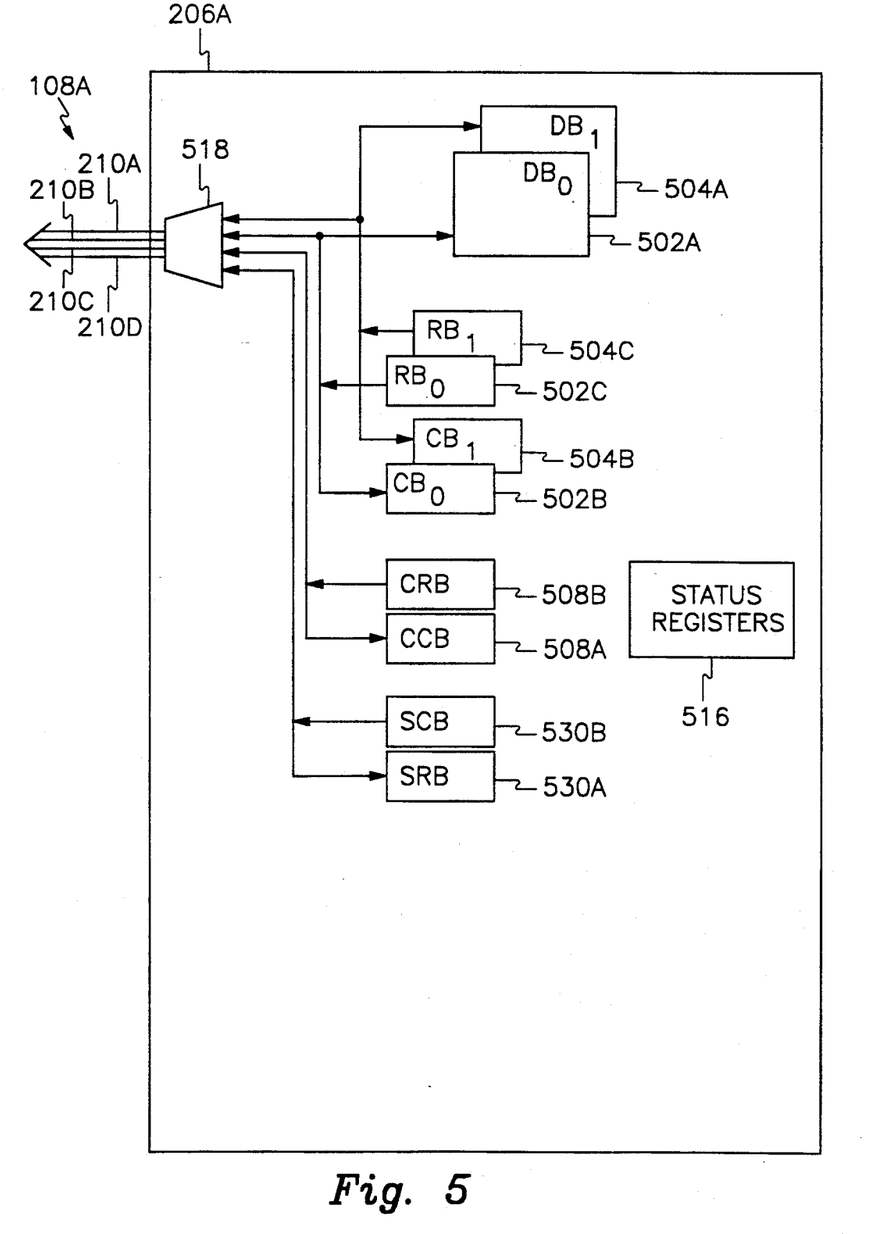
FIG. 5 presents a structural diagram of controllers 206.

On a single communication link 108, the interface 204 may not simultaneously process more DX interactions than the corresponding controller 206 (that is, the controller 206 with whom the interface 204 is performing the DX interactions) has DX buffer sets 502, 504.

The interface 204 selects the DX buffer sets 302, 304 to be used for the DX interactions. The interface 204 queues pending DX interactions in a random access memory (RAM) when the pending DX interactions exceed the available DX buffer sets 302, 304.

The interface 204 also initiates the CX interactions. A CX buffer set 308 is associated with each CX interaction. The interface 204 may simultaneously process X independent CX interactions, where X equals the number of CX buffer sets 308. For example, since the interface 204 has one CX buffer set 308, the interface 204 may process one CX interaction at any time.

On a single communication link 108, the interface 204 may not simultaneously process more CX interactions than the corresponding controller 206 (that is, the controller 206 with whom the interface 204 is performing the CX interactions) has CX buffer sets 508.

The interface 204 selects the CX buffer sets 308 to be used for CX interactions. The interface 204 queues pending CX interactions in the RAM when the pending CX interactions exceed the available CX buffer sets 308. According to the preferred embodiment of the present invention, CX interactions are short and infrequent, but are of higher priority than DX interactions.

The interface 204 does not initiate the SX interactions. Thus, the interface 204 must be able to process N*K simultaneous SX interactions, where K is the number of active SX interactions and N is the number of communication links 108 (in FIG. 3, N=4 and K=1). A SX buffer set 330, 332, 334, 336 is associated with each SX interaction. Thus, N*K SX buffer sets 330, 332, 334, 336 are required in the interface 204. According to a preferred embodiment of the present invention, SX interactions are short and infrequent. SX frames are higher priority than DX frames. One SX buffer set 330, 332, 334, 336 is included per communication link 108.

Figure 4:
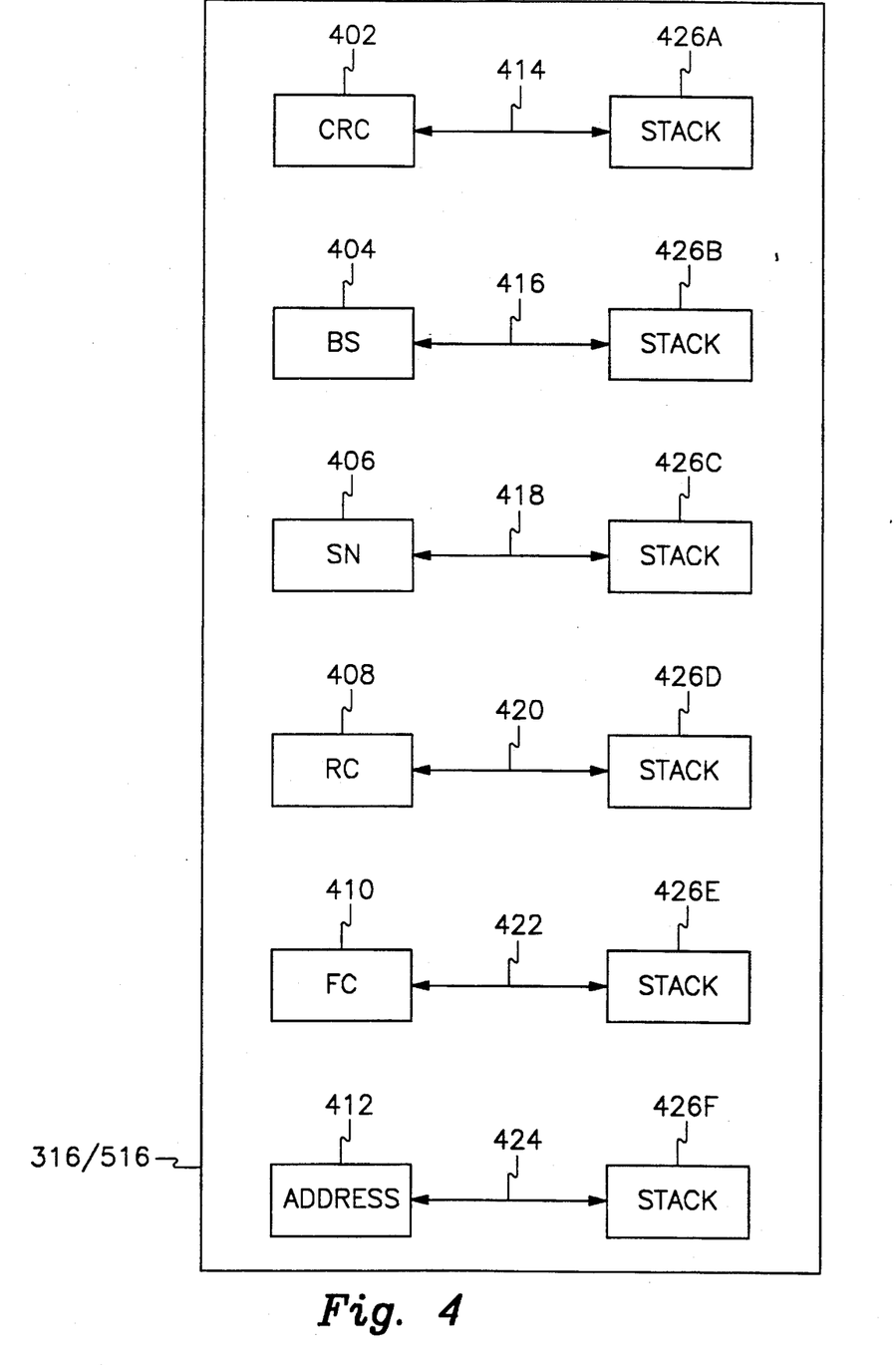
FIG. 4 presents a structural diagram of status registers 316.

FIG. 4 presents a structural diagram of the frame status registers 316. The interface 204 uses the frame status registers 316 to control the transfer of data and command frames from the CPC 104A to the CSCs 106 during the DX, CX, and SX interactions.

The interface 204 includes a cyclic redundancy code CRC register 402, a buffer select (BS) register 404, a frame sequence number (SN) register 406, a remaining buffer count (RC) register 408, a current frame set byte count (FC) register 410, and an address register 412. The interface 204 also includes first-in first-out (FIFO) stacks 426 for temporarily storing the contents of the CRC register 402, BS register 404, SN register 406, RC register 408, FC register 410, and address register 412.

FIG. 5 presents a structural diagram of the controllers 206. The controllers 206 have the same structure and operation. For clarity, only the controller 206A is shown in FIG. 5.

The controller 206A includes DX buffer sets 502, 504, a CX buffer set 508, and a SX buffer set 530. The DX buffer sets 502, 504 are used during DX interactions. The CX buffer set 508 is used during CX interactions. The SX buffer set 530 is used during SX interactions.

The DX buffer sets 502, 504 each include a 32 Kbyte data buffer (DB) 502A, 504B, a 256 byte control buffer (CB) 502B, 504B, and a 256 byte return buffer (RB) 502C, 504C.

The CX buffer set 508 includes a 256 byte command buffer (CCB) 508A and a 256 byte response buffer (CRB) 508B.

The SX buffer set 530 includes a 256 byte response buffer (SRB) 530A and a 256 byte command buffer (SCB) 530B.

The controller 206A also includes frame status registers 516 and a 1-to-4 multiplexer 518. The controller 206A uses the frame status registers 516 to transfer data and commands from the CSC 106A to the CPCs 104 during the DX, CX, and SX interactions. The structure of the frame status registers 516 is described above with reference to FIG. 4. Note that the frame status registers 316 and 516 are similar in structure and operation.

The controller 206A initiates the SX interactions. A SX buffer set 530 is associated with each SX interaction. The controller 206A may simultaneously process X independent SX interactions, where X equals the number of SX buffer sets 530. For example, since the controller 206A has one SX buffer set 530, the controller 206A may process one SX interaction at any time.

On a single communication link 108, the controller 206A may not simultaneously process more SX interactions than the corresponding interface 204 (that is, the interface 204 with whom the controller 206A is performing the SX interactions) has SX buffer sets 330, 332, 334, 336.

The controller 206A selects the SX buffer sets 530 to be used for the SX interactions. The controller 206A queues pending SX interactions in a random access memory (RAM) when the pending SX interactions exceed the available SX buffer sets 530. According to the preferred embodiment of the present invention, the SX interactions are short and infrequent. Thus, there are minimal performance advantages for including more than one SX buffer set 530.

The controller 206A does not initiate the DX or CX interactions. However, a DX buffer set 502, 504 is associated with each DX interaction. Also, a CX buffer set 508 is associated with each CX interaction. Thus, the controller 206A must have sufficient DX buffer sets 502, 504 and CX buffer sets 508 in order to support the number of active DX and CX interactions which the corresponding interface 204 (that is, the interface 204 with whom the controller 206A is performing the DX and CX interactions) may have simultaneously active on the corresponding communication link 108A. For example, as shown in FIG. 5, the controller 206A supports 2 DX interactions and 1 CX interaction.

Figure 6:
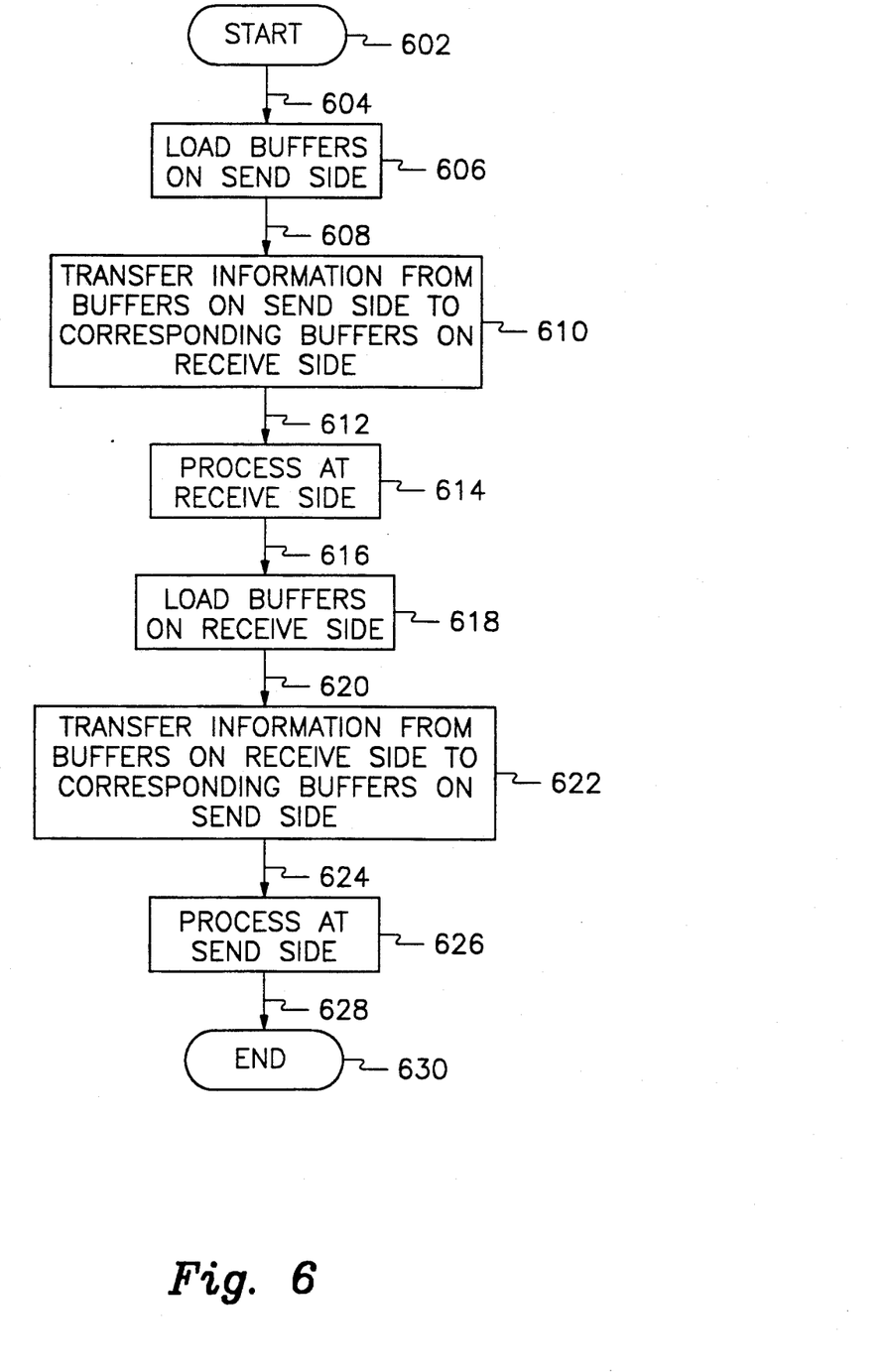
FIG. 6 illustrates the operation of the CPCs 104 and the CSCs 106 during TX, CX, and SX interactions.

FIG. 6 illustrates the operation of the CPCs 104 and the CSCs 106 during the DX, CX, and SX interactions. For illustrative purposes, FIG. 6 is described below using a scenario wherein the CPC 104A is sending a WRITE command to the CSC 106A on communication link 108A.

Prior to step 606, the CPC 104A sends the WRITE command to the interface 204.

In step 606, the interface 204 selects one of the DX buffer sets 302, 304 in the CPC 104A for processing the WRITE command. The interface 204 keeps track of the status of the DX buffer sets 302, 304 (that is, whether the DX buffer sets 302, 304 are processing other DX interactions). If all of the DX buffer sets 302, 304 are being used to process other DX interactions, then the interface 204 queues the WRITE command in the RAM. For illustrative purposes, assume that the interface 204 selects the DX buffer set 302.

After selecting the DX buffer set 302, the interface 204 loads the DB 302A and CB 302B. The DB 302A is loaded with the data contained in the WRITE command. The CB 302B is loaded with instructions. The instructions specify the manner in which the CSC 106A is required to process the data.

In step 610, the interface 204 selects one of the DX buffer sets 502, 504 in the CSC 106A (and specifically in the controller 206A) for processing the WRITE command. The interface 204 keeps track of the status of the DX buffer sets 502, 504 (that is, whether the DX buffer sets 502, 504 are processing other DX interactions). For illustrative purposes, assume that the interface 204 selects the DX buffer set 502.

After selecting the DX buffer set 502, the interface 204 transfers the contents of the DB 302A and the CB 302B to the DB 502A and the CB 502B, respectively, over the communication link 108A. During the transfer of a frame, the next location in the DB 302A or the CB 302B buffer to be fetched for transmission is held in the address register 412 of the status registers 316.

In step 614, the controller 206A processes the data in the DB 504A according to the instructions in the CB 504B. For example, the controller 206A may save the data in the secondary storage device 110A.

In step 618, the controller 206A generates a reply. The reply contains information regarding the status of the WRITE command (for example, whether the WRITE command was successfully performed). Then, the controller 206A loads the RB 504C with the reply.

In step 622, the controller 206A sends the contents of the RB 302C to the RB 504C over the communication link 108A. During the transfer of a frame, the next location in the RB 504C to be fetched for transmission is held in the address register 412 of the status registers 516.

In step 626, the interface 204 processes the reply in the RB 302C. Following step 626, the processing of the WRITE command is complete.

Steps 610 and 622 are described in greater detail below. That is, the manner in which information is transferred between the interface 204 and the controller 206A is described in greater detail below.

According to a preferred embodiment of the present invention, a nested frame communication protocol is used to transfer data between the interface 204 and the controller 206A.

According to the nested frame communication protocol, the data relating to a CPC/CSC interaction (and contained in a buffer, such as the DB 302A) is placed into frames. The frames are transferred between the interface 204 and the controller 206A over the fiber optic links 210 associated with the communication link 108A.

As noted above, the fiber optic links 210 operate in parallel. According to the nested frame communication protocol, the data is "byte striped" across the fiber optic links 210. For example, suppose that the data relating to a CPC/CSC interaction (and contained in a buffer, such as the DB 302A) consists of data byte 0, data byte 1, data byte 2, ..., data byte N. In FIG. 3, data byte 0 is transmitted as the first data byte in the frame on fiber optic link 210A. Data byte 1 is transmitted as the first data byte in the frame on fiber optic link 210B. Data byte 2 is transmitted as the first data byte in the frame on fiber optic link 210C. Data byte 3 is transmitted as the first data byte in the frame on fiber optic link 210D. Data byte 4 is transmitted as the second data byte in the frame on fiber optic link 210A.

A set of four frames on the fiber optic links 210 (that is, one frame on each of the fiber optic links 210) is called a frame set. If necessary, the frames are padded with zero data bytes so that the frames of a particular frame set are the same size.

If the data relating to a CPC/CSC interaction (and contained in a buffer, such as the DB 302A) cannot be transferred in a single frame set, then multiple frame sets are used to transfer the data. The multiple frame sets are called a frame set group.

Each frame includes a header, data (from 0 to 1024 bytes), and trailing CRC (cyclic redundancy code) bytes. Each frame is terminated by an end of frame mark.

The CRC register 402 is used to hold the intermediate value of the frame CRC which is computed incrementally as each byte of the frame is transmitted or received. This intermediate value is appended to the end of the frame as the CRC value for that frame by the transmission logic. The intermediate value of the CRC will be zero in the receiver at the end of the frame (after reception of the entire frame including the transmitted CRC).

The header contains a start of frame mark, a buffer select code (BS), a frame sequence number (SN), a remaining buffer count (RC), and the current frame set byte count (FC). The BS identifies one of the DX, CX, or SX buffer sets, and the specific buffer (the cb, db, or rb) in that set. The SN is used to sequentially number the frames of a buffer set exchange, and is used to detect any lost frames. The RC is the total amount of data remaining to be sent to the specific target buffer in this frame and any subsequent frames of this CPC/CSC buffer exchange sequence. For example, if 2.5 Kbytes are to be sent from 302A to 502A using two 1 Kbyte frames and a single half Kbyte frame, then this value will be 2.5 Kbytes for the initial frame, 1.5 Kbyte for the second frame, and 0.5 Kbytes for the last frame. The FC is the number of bytes to be transferred in this frame. For example, if 2.5 Kbytes are to be sent from 302A to 502A using two 1 Kbyte frames and a single half Kbyte frame, then this value will be 1 Kbytes for the first two frames and 0.5 Kbytes for the last frame.

Based on the above description, a frame set (having four frames) may be represented as follows:

(. BS. SN, RC. FC. D0-3. D4-7, . . . , CRC.)
REPRESENTATION 1 where "(" and ")" represent the start and end of frame marks, respectively.

Normally, the frames associated with a CPC/CSC interaction are transferred between the interface 204 and the controller 206A without interruption. However, according to the nested frame communication protocol of the present invention, the transfer of frames associated with a lower priority CPC/CSC interaction may be interrupted in order to transfer frames associated with a higher priority CPC/CSC interaction. The CX and SX interactions have higher transmission priorities than the DX interactions.

Figure 7:
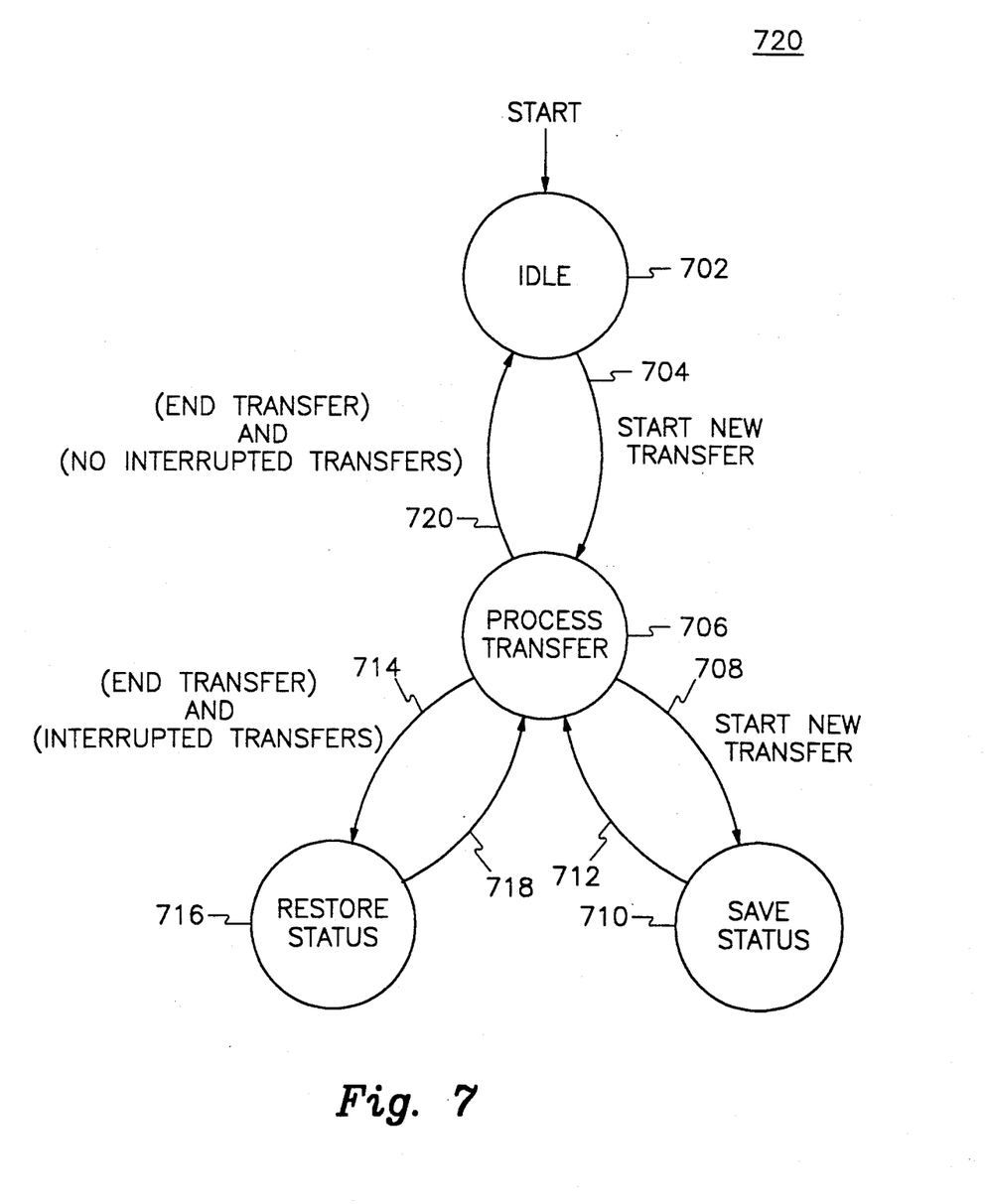
FIG. 7 illustrates a state diagram according to a nested frame communication protocol of the present invention.

FIG. 7 illustrates a state diagram 720. The state diagram 720 represents the operation of the state machines 202 during steps 610, 622 according to the nested frame communication protocol of the present invention. Specifically, the state diagram 720 represents the operation of the state machine 202A during step 610 (that is, while the CPC 104A is transmitting). The state diagram 720 represents the operation of the state machine 202B during step 622 (that is, while the CSC 106A is transmitting).

The state diagram 720 contains an idle state 702, a process transfer state 706, a save status state 710, and a restore status state 716.

The state machine 202 (either state machine 202A or 202B) starts in the idle state 702. While in the idle state 702, the state machine 202 is not transferring frames.

Upon receiving a start new transfer signal 704 (such as the start of frame mark), the state machine 202 enters the processing transfer state 706. During the processing transfer state 706, the state machine 202 processes a transfer associated with a CPC/CSC interaction (and also associated with the start new transfer signal 704). Specifically, the state machine 202 transfers the frames associated with the CPC/CSC interaction. The manner in which the frames are transferred is described above with reference to REPRESENTATION 1. For illustrative purposes, this CPC/CSC interaction is referred to as Transfer 1.

If the state machine 202 receives a start new transfer signal 708 (such as the start of frame mark) while in the process transfer state 706, then the state machine 202 interrupts the transfer of frames associated with the current CPC/CSC interaction (that is, Transfer 1) and enters the save status state 710. During the save status state 710, the state machine 202 saves the processing status of the current CPC/CSC interaction (that is, Transfer 1). Specifically, the state machine 202 pushes the contents of the CRC register 402, BS register 404, SN register 406, RC register 408, FC register 410, and address register 412 into the respective stacks 426. Transfer 1 represents an interrupted transfer.

The nested frame communication protocol of the present invention does not specify a maximum level of nesting. Rather, the maximum level of nesting is implementation dependent and depends solely on the depth of the stacks 426. In a preferred embodiment of the present invention, a single level of nesting is used.

After saving the processing status of the current CPC/CSC interaction (that is, Transfer 1) during the save status state 710, the state machine 202 returns to the process transfer state 706.

During the process transfer state 706, the state machine 202 processes a CPC/CSC interaction which is associated with the start new transfer signal 708. Specifically, the state machine 202 transfers the frames associated with the CPC/CSC interaction. The manner in which the frames are transferred is described above with reference to REPRESENTATION 1. For illustrative purposes, this CPC/CSC interaction is referred to as Transfer 2.

The state machine 202 remains in the process transfer state 706 until Transfer 2 is complete (that is, all the frames associated with Transfer 2 have been transferred), or until a start new transfer signal 708 is received. Once Transfer 2 is complete, the state machine 202 receives an end transfer signal (such as the end of frame mark).

If the state machine 202 receives the end transfer signal and interrupted transfers do not exist (that is, the stacks 426 are empty), then the state machine 202 enters the idle state 702.

If the state machine 202 receives the end transfer signal and interrupted transfers exist (that is, the stacks 426 are not empty), then the state machine 202 enters the restore status state 716. During the restore status state 716, the state machine 202 pops the processing status of the interrupted transfer that is at the top of the stacks 426. Specifically, the state machine 202 restores the contents of the CRC register 402, BS register 404, SN register 406, RC register 408, FC register 410, and address register 412 from the top of the stacks 426. For illustrative purposes, suppose the state machine 202 restores the processing status of Transfer 1.

After restoring the processing status of Transfer 1, the state machine 202 returns to the process transfer state 706. During the process transfer state 706, the state machine 202 resumes the processing of Transfer 1. Specifically, the state machine 202 transfers the untransferred frames associated with Transfer 1 (that is, those frames which were not transferred before Transfer 1 was interrupted by Transfer 2).

Based on the above description, the processing of frame sets (each having four frames) associated with two CPC/CSC interactions having different priority levels may be represented as follows:

(.BS.SN.RC.FC.D0-3.(.BS.SN.RC.FC.D0-3.D4-7...
.. CRC.).D4-7. ... CRC.) REPRESENTATION 2

As shown in REPRESENTATION 2, Transfer 1 (which starts at the first '(' symbol) is interrupted by Transfer 2 (which starts at the second '(' symbol). Before being interrupted by Transfer 2, the four frames associated with Transfer 1 transfers data bytes D0, D1, D2, and D3. After the processing of Transfer 2 is complete, the processing of Transfer 1 resumes with data bytes D4, D5, D6, and D7.

Thus, the nested frame communication protocol of the present invention maximizes data transfer rates (because frame sizes can be large) and minimizes transmission latency of high priority frames (because higher priority frames may interrupt the transmission of lower priority frames).

While the invention has been particularly shown and described with reference to (a) preferred embodiment(s) thereof, it will be understood by those skilled in the art that (various changes) (the foregoing and other changes) in form and details may be made therein without departing from the spirit and scope of the invention.

Having thus described our invention, what we claim as new and desire to secure by Letters Patent is:

1. A method for communicating between computers, said method comprising the steps of:
   (a) receiving a first frame for transmission, wherein said first frame comprises a first transmission priority;
   (b) transmitting said first frame over a communication link;
   (c) receiving a second frame for transmission, wherein said second frame comprises a second transmission priority;
   (d) immediately interrupting said first frame transmission if said second transmission priority is greater than said first transmission priority;
   (e) immediately transmitting said second frame over said communication link when said first frame transmission is interrupted; and
   (f) resuming said first frame transmission when said second frame transmission is complete.

2. The method of claim 1, wherein step (d) comprises the step of saving a processing state of said first frame transmission.

3. The method of claim 2, wherein the step of saving a processing state of said first frame transmission comprises the steps of:
   saving a first register comprising an intermediate cyclic redundancy code;
   saving a second register comprising a buffer select code;
   saving a third register comprising a frame sequence number;
   saving a fourth register comprising a remaining buffer count;
   saving a fifth register comprising a current frame set byte count; and
   saving a sixth register comprising a buffer data address.

4. The method of claim 2, wherein step (f) comprises the step of restoring said processing state of said first frame transmission.

5. The method of claim 4, wherein the step of restoring said processing state of said first frame transmission comprises the steps of:
- restoring a first register comprising an intermediate cyclic redundancy code;
- restoring a second register comprising a buffer select code;
- restoring a third register comprising a frame sequence number;
- restoring a fourth register comprising a remaining buffer count;
- restoring a fifth register comprising a current frame set byte count; and
- restoring a sixth register comprising a buffer data address.

6. A computer system comprising:
(1) communication links for physically connecting said computer system to remote computer systems;
(2) communication interface means for communicating with said remote computer systems via said communication links, said communication interface means comprising:
 (a) means for transmitting frames over a selected communication link, wherein said selected communication link represents one of said communication links;
 (b) means for immediately interrupting lower priority frame transmissions in order to transmit higher priority frames over said selected communication link;
 (c) means for immediately transmitting higher priority frame transmissions over said selected communications link; and
 (d) means for resuming said lower priority frame transmissions over said selected communication link when said higher priority frames are completely transmitted.

7. The computer system of claim 6, wherein said communication interface means further comprises one or more frame status register sets, each of said frame status register sets comprising:
- a first register for calculating a cyclic redundancy code;
- a second register for storing a buffer select code;
- a third register for storing a frame sequence number;
- a fourth register for storing a remaining buffer count;
- a fifth register for storing a current frame set byte count; and
- a sixth register for storing a buffer data address.

8. The computer system of claim 7, wherein said means for interrupting comprises means for saving processing states of said lower priority frame transmissions.

9. The computer system of claim 8, wherein said means for saving processing states comprises means for saving said first, second, third, fourth, fifth, and sixth registers.

10. The computer system of claim 8, wherein said means for resuming comprises means for restoring said processing states of said lower priority frame transmission.

11. The computer system of claim 10, wherein said means for restoring comprises means for restoring said first, second, third, fourth, fifth, and sixth registers.

12. A method for communicating between computers, said method comprising the steps of:
 (a) receiving a new frame for transmission;
 (b) immediately interrupting transmission of a preceding frame over a communication link if said preceding frame comprises a lower transmission priority than said new frame;
 (c) immediately transmitting said new frame over said communication link when said preceding frame transmission is interrupted;
 (d) repeating steps (a)–(c), wherein said new frame becomes said preceding frame.

13. The method of claim 12, wherein step (c) comprises the step of resuming said preceding frame transmission when said new frame transmission is complete.

* * * * *